1,986,405

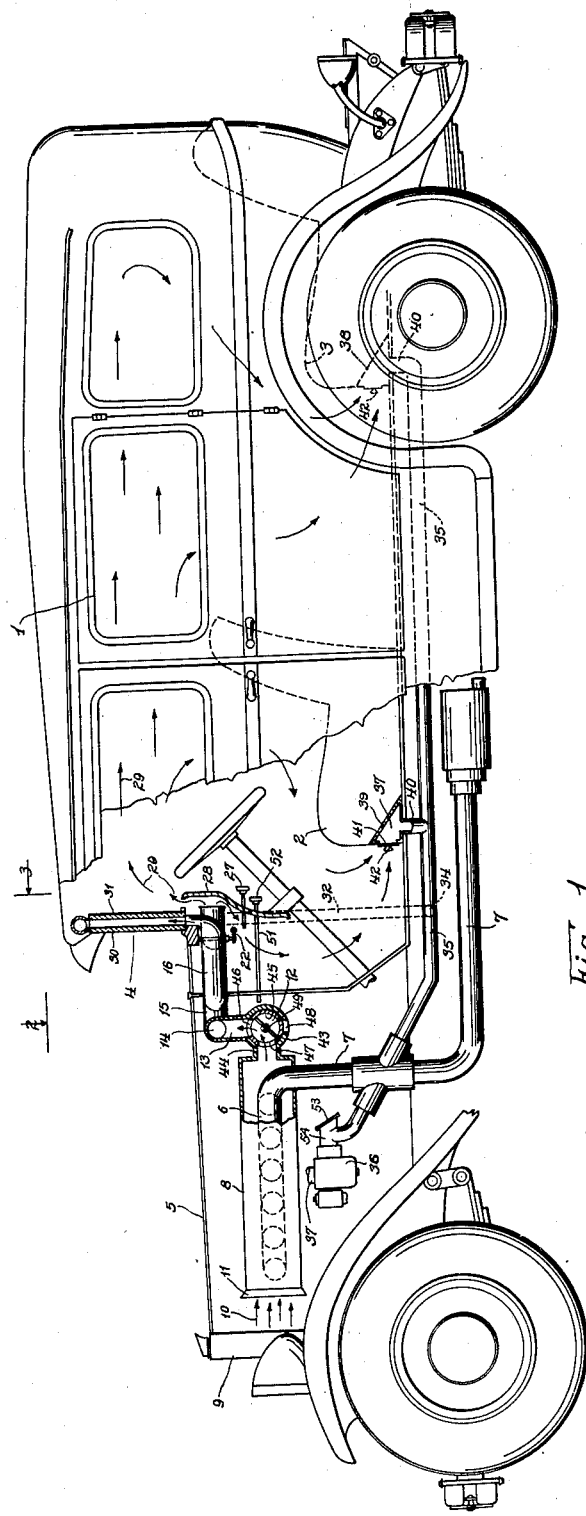
Jan. 1, 1935. B. J. MEARS 1,986,405
AUTOMOBILE HEATING AND VENTILATING APPARATUS
Filed Nov. 17, 1930
INVENTOR.
Barton J. Mears
BY Slough and Canfield
ATTORNEYS Patented Jan. 1, 1935

UNITED STATES PATENT OFFICE 1,986,405

AUTOMOBILE HEATING AND VENTILATING APPARATUS

Barton J. Mears, Cleveland, Ohio

Application November 17, 1930, Serial No. 496,120

8 Claims. (Cl. 20—40.5)

This invention relates to heating and ventilating apparatus for automobiles.

It is one of the objects of this invention to provide an improved apparatus by which heat from an automobile engine may be employed to heat the interior of an automobile and/or to warm the windshield thereof, and by which the air within the automobile may continuously be withdrawn and renewed to maintain the same fresh and healthful for use of the occupants of the car.

Another object is to provide a heating and ventilating system for automobiles having regulating and adjusting means therefor to adapt the operation of the system to various weather conditions and whereby, among other results, the system may be operated to effect: heating of the windshield alone; and/or heating of the interior of the car alone; and/or heating of the windshield and heating of the interior of the car together; and/or varying of the relative proportions and amounts of heat supplied to the windshield and/or to the interior of the car from maximum amounts to none at all; renewing the air in the interior of the car whether it is being heated or not; and varying the rate of renewal of the air in the car.

Another object is to provide a ventilating and heating system of the class referred to adapted to operate continuously and without rotating or other continuously moving mechanical parts.

Another object is to provide a heating and ventilating system for motor cars in which the air in the car may be exhausted therefrom for renewal purposes by the suction in the intake manifold of the engine in an improved manner.

Another object is to provide in a heating and ventilating system for motor cars in which the air in the body of the car is exhausted and renewed by suction in the intake manifold, means to prevent, upon the occurrence of "backfire" of the engine, products of combustion from being introduced into the body of the car through the air exhausting system.

Another object is to provide an improved heating and ventilating system for automobiles.

Other objects will be apparent to those skilled in the art to which my invention appertains.

My invention is fully disclosed in the following description taken in connection with the accompanying drawing, in which Fig. 1 is a side elevational view of an automobile in which an embodiment of my invention is installed, parts of the car structure being broken away to reveal the elements of the heating and ventilating system, and with some of the parts of the system illustrated diagrammatically;

Fig. 2 is a fragmentary view taken from the plane 2 of Fig. 1 and illustrating parts of the heating and ventilating system, the view being in some respects diagrammatic;

Fig. 3 is a fragmentary view in some respects diagrammatic taken from the plane 3 of Fig. 1 or of Fig. 2;

Fig. 4 is a fragmentary view similar to a part of Fig. 1, drawn to a larger scale.

Referring now to the drawing, I have illustrated generally in Fig. 1 a motor car of modern design comprising generally an enclosed body 1, seats 2 and 3 therein, a windshield construction 4, an engine hood 5 under which the engine is concealed in the usual manner, and other parts which, by their well known forms, will be recognized in the drawing, but which, because they form no essential part of my invention, need not be described herein.

The engine of the motor car may be of any known or suitable construction and comprises among other parts an exhaust manifold 6 connected to an exhaust pipe 7. Surrounding the manifold 6 is an air heater or stove 8 through which outside air, after passing through the car radiator 9 as indicated by arrows 10, may flow and be heated, by the heat of the manifold, the movement of the air being effected by the forward movement of the car and/or the radiator fan not shown supplemented by a suction system to be described.

The stove 8 may be of any suitable construction but comprises generally a sheet metal housing enclosing the exhaust manifold 6, open at the forward end as indicated at 11 for the admission of air to be heated. At the rear of the stove 8, the heated air flows through a valve 12 to be described and thence, by hot air conduits 13, 14 and 15, to a distributing manifold 16 disposed generally horizontally at a level preferably below the lower edge of the windshield construction 4. The manifold 16 extends transversely of the car and at its opposite ends terminates in forks 17—17 comprising each an upwardly directed nozzle 18 and a generally horizontally directed nozzle 19. A gate or valve 20, Fig. 2, is pivoted or hinged at the crotch of the forks 17 as at 21 and has connected thereto an arm 22 by which the valve 20 may be rotated. In the position shown, the gate 20 closes the nozzle 19; and the nozzle 18 is accordingly fully open. Upon rotational movement of the arm 22, the gate 20 may be rotated around to the position indicated in dotted lines at 23 to open the nozzle 19 and close the nozzle 18; or the gate 20 may be disposed in any intermediate position in which both nozzles 18 and 19 may be opened any desired amount. To rock the valve arms 22—22, they are connected by rods 24—24 to a bell crank 25 adapted to be adjustably rocked by a rod 26 provided with a handle 27, Figs. 1 and 2.

Disposed in front of the nozzle 19 is a baffle 28 which may be the instrument board of the motor car.

It will now be understood that hot air, when the nozzle 19 is open, may flow therethrough into the interior of the car body 1 following the direction indicated by the arrows 29, the direction of flow after the air leaves the nozzle 19 being upwardly toward the roof of the car, the air being deflected in this direction by the baffle 28 for the double purpose of preventing the hot air from being blown directly against occupants of the seat 2, and to insure thorough circulation of the heated air in the car body.

The nozzles 18 project upwardly into the space between the two sheets of glass 30 and 31 of a double windshield indicated generally at 4. The transverse dimension of the windshield and the transverse distance between the nozzles 18 is so proportioned that the nozzles 18 will be disposed generally in the lower corners of the windshield as indicated in Fig. 3. At the upper edge of the double windshield and approximately midway between the ends of the windshield, a pipe 32 communicates with the space between the windshields 30 and 31. As will now be clear, hot air leaving the nozzles 18—18 may flow between the parts 30 and 31 of the windshield and by natural convection will be distributed throughout this space, flowing across the same and upwardly and leaving the windshield by way of the pipe 32, the path of the heated air thus taken being indicated generally by the arrows 33.

The exact construction of the windshield 4 forms no essential part of my invention, it being sufficient that the two pieces of glass 30 and 31 thereof may be suitably spaced apart and supported in position in the car, and the outer rectangular peripheral edges thereof joined or connected or sealed so as to confine the flow of hot air to the path indicated and described above from the nozzles 18 to the pipe 32.

The pipe 32 is led from the upper central portion of the windshield as indicated in Fig. 3, across the top of the windshield and down one side of the motor car, preferably concealed within the framework thereof, and is finally joined as at 34 to a suction line or pipe 35. The suction line 35 is connected to the air intake side of the carburetor of the engine, shown generally at 36, and thus air is supplied to the carburetor 36 through this line 35. The carburetor 36 is connected in the usual way to the intake manifold of the engine, whereby suction or partial vacuum is effected in the line 35 by the engine.

Therefore, upon operation of the engine, the hot air which has passed through the windshield and which flows downwardly in the pipe 32, is drawn through the line 35 and through the carburetor into the engine. The relatively high temperature of this air conduces to better operation of the carburetor for reasons well known in this art.

The heated air which has been forced into the car body out of the nozzles 19 as described hereinbefore, after circulating through the car to heat the same, is exhausted therefrom through ventilators 37 and 38 disposed respectively under forward portions of the seats 2 and 3. The ventilators 37 and 38 may be of any desired or suitable construction, the exact construction constituting no essential part of my invention. As indicated in the drawing, the ventilators may be alike and as shown in connection with the ventilator 37, comprise generally a small box or compartment 39 communicating by a conduit 40 with the suction line 35. The suction or partial vacuum of the line 35 is thus communicated to the box 39 and thence to the interior of the car body, the box 39 being open on one side as at 41 for this purpose. The opening 41 may be adjustably covered by a movable grid 42 constructed like an ordinary register to regulate the flow of air from the interior of the car outwardly through the ventilator. If desired, the ventilators 37 and 38 may be entirely shut off by closing the grids or registers 42.

From the foregoing description, it will be observed that the air which flows out of the stove 8 may, by operating the gate 20 by means of the handle 27, all be caused to flow through the windshield to warm the same as might be desired under weather conditions tending to coat the windshield with ice or frost and when it is not desired to heat the interior of the car.

Similarly, all of the heat may be directed to heat the interior of the car by moving the gate 20 into the other extreme position, as might be desired in cold clear weather. Again, both the windshield and the interior of the car may be heated in any desired proportion or amount by correspondingly moving the handle 27 and the gate 20. In any position of the gate 20, the flow of hot air through the windshield and/or through the body of the car is effected both by the pressure tending to force the air forward effected by the same instrumentalities which force air through the car radiator, and also by suction pulling the air through the windshield and/or through and out of the body of the car, the suction being created by the engine acting through the carburetor.

As a result of the system of apparatus above described, not only is the car body warmed by a supply of fresh outside air thereto, but the air therein is continuously exhausted therefrom so that the air being breathed by the occupants of the car is not only warm but healthfully pure.

Furthermore, during weather conditions in which it is not desired to actually heat the air in the car, the air therein may be maintained fresh and pure by the operation of the ventilator 37, which when the registers 42 are open, will exhaust by suction the used air in the car thus forcing an intake of air to the car body to occur through or around the windows, doors etc.

When it is desired to shut off all supply of hot air, or to regulate the total volume of hot air supplied, the valve 12, now to be described, may be operated.

The valve 12 comprises an outer housing 43 generally of hollow cylindrical form communicating by conduit 44 with the heater 8 and communicating at a right angle thereto with the conduit 13 above described. Within the housing 43 is rotatably mounted a hollow cylindrical valve element 45 substantially fitting the interior of the hollow cylindrical casing or housing 43 and provided with a pair of ports 46 and 47 in its cylindrical wall and disposed substantially at a right angle to each other. The wall of the housing 43 is also provided with a port 48 communicating with the atmosphere. By rotating the valve element 45 as, for example, on a shaft 49 supported in the housing 43, the ports 46 and 47 may be disposed to register respectively with the conduit 44 and the conduit 13, thus opening a passageway from the heater 8 through the valve 12 for the flow of hot air; and by rotating the valve element 45 by preselected amounts from said position, the ports 46 and 47 will be partially closed off and a flow of hot air through the valve may be reduced as desired, or may be entirely shut off. To ventilate the heater 8, the valve element 45 may be rotated to register the port 46 with the conduit 44 and to register the port 47 with the port 48 whereupon heated air from the heater may flow through the valve and be discharged downwardly through the port 48 into the atmosphere.

To operatively rotate the valve element 45 as just described, a crank 50, Fig. 2, may be connected to the shaft 49 and a rod 51 connected to the crank 50, the rod 51 extending rearwardly through the instrument panel 28 and terminating in a handle 52. Upon pushing or pulling on the handle 52, the valve may be operated in a well known manner.

Upon the occurrence of a "backfire" of the engine, products of combustion of gas in the engine cylinder may be forced backward through the engine intake manifold and through the carburetor. To prevent such products of combustion from moving backwardly through the suction line 35 and entering the car body through the ventilators 37 and 38, a check valve of any known or suitable construction may be disposed in the line 35. Preferably, however, I employ a back valve discharging into the atmosphere, and have illustrated one type thereof at 53 as associated with the carburetor. The check valve comprises a short conduit 54 communicating with the air intake side of the carburetor and adapted to be closed at its outer end by a flap valve 53 hinged on the conduit as at 55 and adapted to be maintained in the closed position illustrated by a spring shown in dotted lines in Fig. 4. Inasmuch as valves of this general type are well known, it is not believed that further description is necessary. Upon occurrence of the "backfire", the valve 53 is forceably opened and the pressure created by the "backfire" exhausts therethrough to the atmosphere. At all other times the valve 53 is maintained closed, both by the spring 56 and by the partial vacuum created in the carburetor by the suction of the engine.

My invention is not limited to the exact details of construction shown and described. Many changes in and modifications of the embodiment hereinbefore described and illustrated in the drawing may be made within the scope and spirit of my invention without sacrificing its advantages.

I claim:

1. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to and through the space between the windshield sections, and conduit means for conducting the air from the said space connected to the air supply suction inlet of the engine carburetor.

2. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to the interior of the vehicle and to the space between the windshield sections, an outlet from the vehicle body, a conduit connecting the outlet with the air supply suction inlet of the engine carburetor, conduit means for conducting the air from the said space between the windshield sections and connected to the air supply suction inlet of the engine carburetor, and manually operable valve means in said first-mentioned conduit for varying the proportions of heated air flowing to the said windshield sections and to the car interior.

3. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, a main conduit means leading from the heater, secondary conduit means for conducting heated air from the heater to the interior of the vehicle, an air outlet from the vehicle interior, a conduit connecting the outlet with the air supply suction inlet of the engine carburetor, secondary conduit means for conducting the heated air from the heater to and through the space between the windshield sections and conduit means for conducting the air from the said space to the air supply suction inlet of the engine carburetor, a manually operable valve for varying the proportions of air flowing through the secondary conduit means to the windshield sections and to the car interior, and a valve in the main conduit means for varying the total flow of heated air from the heater.

4. In a heating and ventilating system for internal combustion engine driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to the windshield and admitting it to the space between the sections at two opposite lateral portions of the space, and conduit means for conducting the air from the said space at a point between the points of admission and connected to the air supply suction inlet of the engine carburetor.

5. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to the space between the windshield sections at two laterally opposite portions of the space and conduit means communicating with the space at a point between the points of admission and above the same and for conducting the air from said space connected to the air supply suction inlet of the engine carburetor.

6. In a heating and ventilating system for internal combustion engine driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to the windshield and admitting it to the space between the sections at two opposite lateral portions of the space, and conduit means for conducting the air from the said space at a point between the points of admission and connected to a portion of the engine air intake system which is at less than atmospheric pressure.

7. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to the space between the windshield sections at two laterally opposite portions of the space and conduit means communicating with the space at a point between the points of admission and above the same and for conducting the air from said space connected to a portion of the engine air intake system which is at less than atmospheric pressure.

8. In a heating and ventilating system for internal combustion engine-driven vehicles, a windshield construction for the vehicle comprising a pair of substantially parallel spaced peripherally sealed sections of transparent material, a heater for heating air from the heat of the engine, pressure supply means for forcing air through the heater, conduit means for conducting the heated air from the heater to and through the space between the windshield sections, and conduit means for conducting the air from the said space connected to a portion of the engine air intake system which is at less than atmospheric pressure.

BARTON J. MEARS.